United States Patent
Oliver et al.

(10) Patent No.: US 6,661,809 B2
(45) Date of Patent: Dec. 9, 2003

(54) METHODS AND COMMUNICATIONS TERMINALS FOR INCREASING CAPACITY CDMA COMMUNICATIONS NETWORKS

(75) Inventors: John Oliver, Chicago, IL (US); Alexandre Mallette, Chicago, IL (US); Mymy Nguyen, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 210 days.

(21) Appl. No.: 09/993,857

(22) Filed: Nov. 14, 2001

(65) Prior Publication Data

US 2003/0091018 A1 May 15, 2003

(51) Int. Cl.[7] ............................. H04B 7/216; H04J 3/06
(52) U.S. Cl. ......................... 370/505; 375/147
(58) Field of Search ........................ 370/498, 499, 370/500, 501, 503, 505, 504, 512, 514, 516, 520; 375/146, 147, 148, 240, 240.28, 240.29, 316

(56) References Cited

U.S. PATENT DOCUMENTS

| | | | |
|---|---|---|---|
| 5,105,435 A | 4/1992 | Stilwell | |
| 5,323,418 A | 6/1994 | Ayerst et al. | |
| 5,978,413 A | 11/1999 | Bender | |
| 6,009,089 A | 12/1999 | Huang et al. | |
| 6,154,443 A | 11/2000 | Huang et al. | |
| 6,222,828 B1 | 4/2001 | Ohlson et al. | |

FOREIGN PATENT DOCUMENTS

| | | |
|---|---|---|
| WO | WO 92/11722 | 7/1992 |
| WO | WO 94/00917 | 1/1994 |
| WO | WO 98/43362 | 10/1998 |
| WO | WO 01/05052 | 1/2001 |
| WO | WO 01/35564 | 5/2001 |

*Primary Examiner*—Willington Chin
*Assistant Examiner*—William Schultz
(74) *Attorney, Agent, or Firm*—Roland K. Bowler, II

(57) ABSTRACT

A method in a code division multiple access communication system having network infrastructure and a plurality of mobile terminals, including transmitting (210) composite signal comprising a synchronization signal and another non-orthogonal signal from the network infrastructure, receiving (220) the composite signal at the plurality of mobile terminals of the code division multiple access communication system, and increasing forward link capacity of the code division multiple access communication system by canceling (230) the synchronization signal from at least some of the plurality of mobile terminals.

20 Claims, 4 Drawing Sheets

METHODS AND COMMUNICATIONS TERMINALS FOR INCREASING CAPACITY CDMA COMMUNICATIONS NETWORKS

FIELD OF THE INVENTIONS

The present inventions relate generally to code division multiple access (CDMA) communications systems, and more particularly to methods and communications terminals for increasing capacity in CDMA communications systems.

BACKGROUND OF THE INVENTIONS

It has been proposed to increase forward link capacity in code division multiple access (CMDA) communication systems by using pilot signal cancellation processing. Intel Corporation, "CPICH Interference Cancellation as a Means for Increasing Downlink Capacity", 3GPP TSG-RAN Working Group, TSGR1-00-1371, November 2000; Intel Corporation, "Further Results on CPICH Interference Cancellation as A Means for Increasing DL Capacity", 3GPP TSG-RAN Working Group, TSGR1-01-0030, January 2001; Intel Corporation, "CPICH Interference Cancellation as A Means for Increasing DL Capacity", 3GPP TSG-RAN Working Group, TSGR4-01-0238, February 2001.

It is known to subtract reconstructed pilot signals prior to Rake receiver de-spreading and integration as disclosed for example in U.S. Pat. No. 6,009,089 entitled "Pilot Interference Cancellation For A Coherent Wireless Code Division Multiple Access Receiver" and in U.S. Pat. No. 5,978,413 entitled "Method And System For Processing A Plurality of Multiple Access Transmissions". It is also known to subtract pilot channel interference at the symbol rate from the output of the Rake receiver, as disclosed for example in U.S. Pat. No. 6,009,089 entitled "Pilot Interference Cancellation For A Coherent Wireless Code Division Multiple Access Receiver", WO 01/05052 entitled "Interference Suppression In A CDMA Receiver", U.S. Pat. No. 5,323,418 entitled "Code Division Multiple Access Inbound Messaging System Utilizing Interference Cancellation to Recover Inbound Messages", and WO 98/43362 entitled "Method And Apparatus For Reducing Spread-Spectrum Noise".

There is a 3GPP proposal to ameliorate paging channel interference resulting from the synchronization channel by adopting a moving offset between the synchronization channel and the paging channel. The moving offset however does not reduce the interference, but instead evenly divides it, temporally, among the user equipment (UE). The moving offset moreover does not eliminate interference caused by the synchronization channel to other channels, such as data, which includes voice traffic.

The various aspects, features and advantages of the present invention will become more fully apparent to those having ordinary skill in the art upon careful consideration of the following Detailed Description of the Invention with the accompanying drawings described below.

DETAILED DESCRIPTION OF THE INVENTIONS

Figure 1:
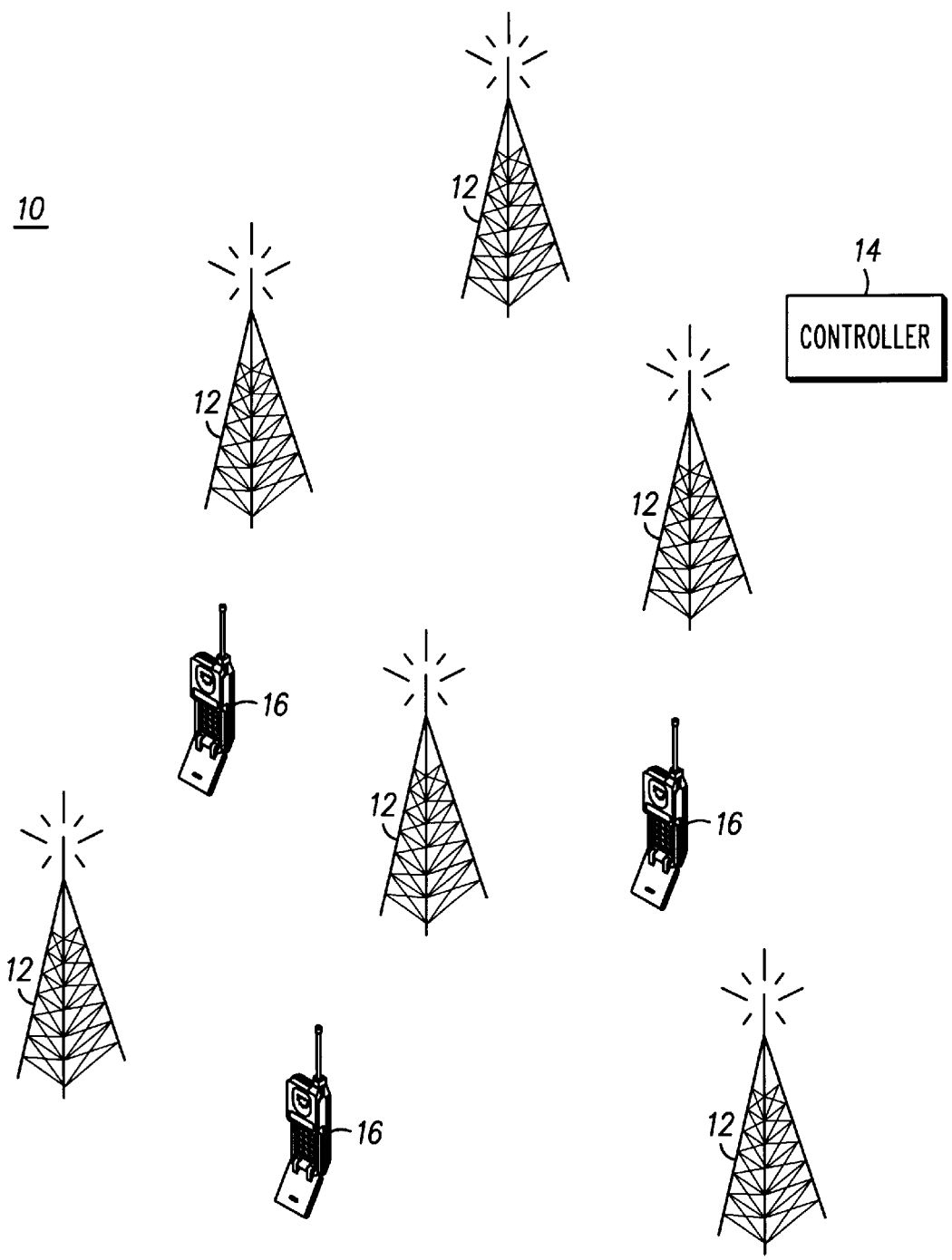
FIG. 1 is an exemplary CDMA communications system.

In FIG. 1, the CDMA communications system 10 comprises a network infrastructure including a plurality of base stations 12 and a corresponding controller 14 and other infrastructure typical of a CDMA communications system known to those having ordinary skill in the art, enabling the communication of a plurality of mobile terminals 16. The communication system includes W-CDMA communication systems.

Figure 2:
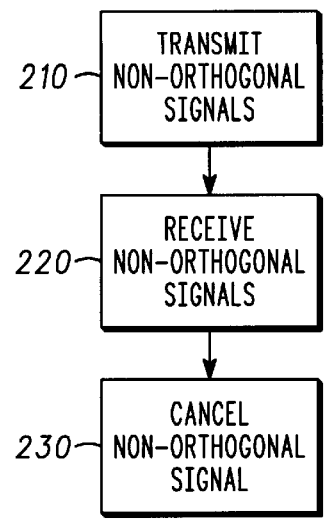
FIG. 2 is a process flow diagram according to an exemplary embodiment of the invention.

In FIG. 2, at block 210, the base stations 12 transmit a composite signal comprising first and second non-orthogonal signals of the code division multiple access communication system. In one embodiment, particularly, the composite signal comprises a synchronization signal and other signals, for example, the other signals may be pilot and data signals, which are orthogonal relative to each other. The pilot and data signals however are non-orthogonal relative to the synchronization signal.

In 3GPP W-CDMA communications systems, the synchronization signal is a periodic "bursty" signal comprising primary and secondary signals, both of which are non-orthogonal to the other signals. In other embodiments, however, the synchronization signal may not be bursty and comprises only a single component or multiple components.

In FIG. 2, at block 220, the first and second non-orthogonal signals are received at a mobile terminal. In the exemplary embodiment, the first and second signals include a synchronization, or "sync", signal, which is non-orthogonal to other signals in the composite signal.

Figure 3:
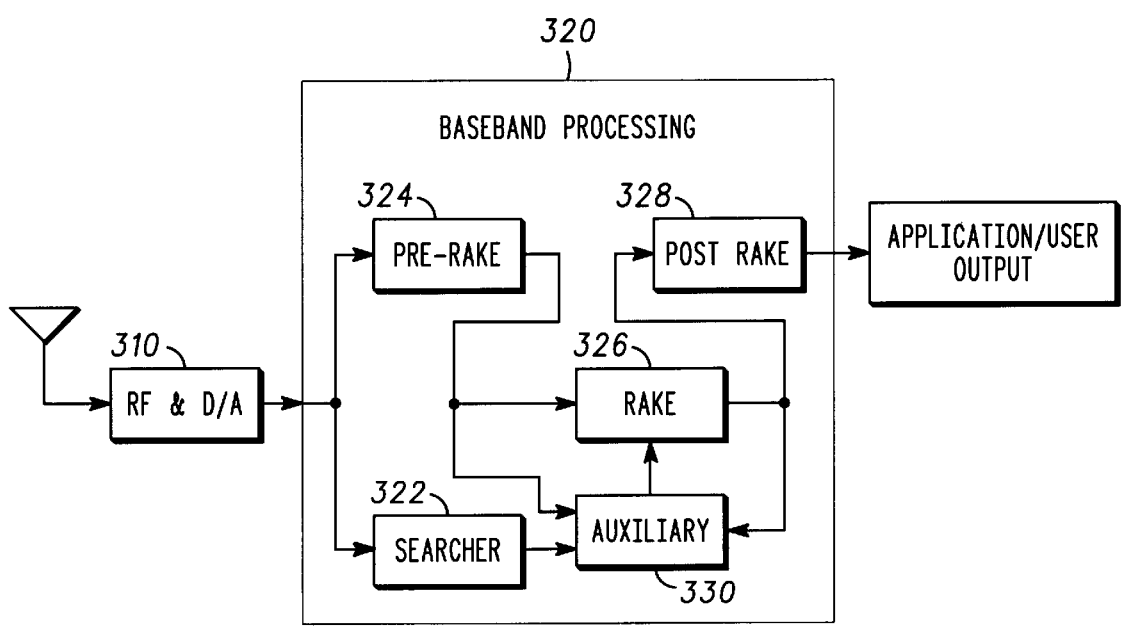
FIG. 3 is an exemplary mobile terminal having a Rake processing portion.

FIG. 3 is an exemplary terminal comprising generally a radio frequency and digital-to-analog conversion portion 310 coupled to a baseband processing portion 320 of the receiver. In the exemplary embodiment, the baseband processing portion of the receiver includes a signal searcher portion 322 and a Rake processing portion having a pre-Rake portion 324, a Rake portion 326 and a post Rake portion 328, and an auxiliary portion 330.

Figure 4:
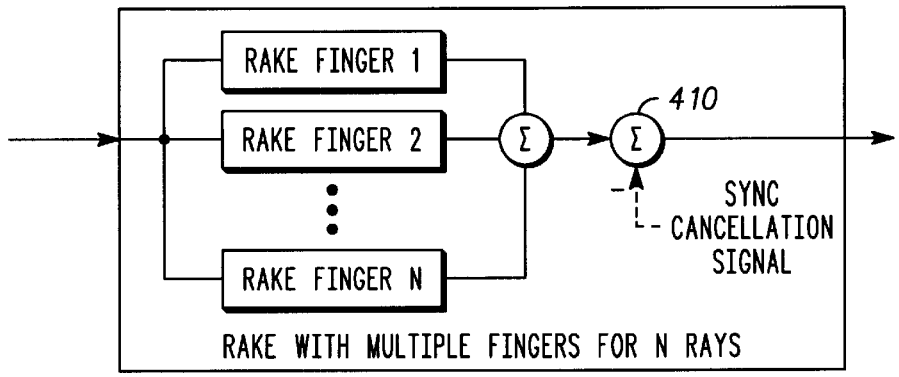
FIG. 4 is a more detailed illustration of the Rake processing portion of FIG. 3.

In FIG. 4, corresponding to the Rake portion 326 of FIG. 3, the Rake processing portion includes a plurality of N Rake fingers having summed outputs, for processing N corresponding signal rays as is known generally by those having ordinary skill in the art. In the exemplary embodiment, the signal searcher portion 322 obtains timing, control and other information from the synchronization signal, as is also well known in the art.

In communication systems, for example 3GPP W-CDMA systems, the synchronization signal tends to reduce system capacity by degrading downlink radio receiver, i.e., the user equipment (UE) or mobile terminals, performance. Because the synchronization signal is non-orthogonal to other components of the composite signal, the Rake processing portion of the receiver does not remove synchronization signal interference. Under flat-fading or line-of-sight conditions, synchronization signal interference can cause substantial performance degradation, 1 to 2 dB, particularly near the base station where the synchronization channel signal is strongest.

In FIG. 2, at block 230, forward link capacity of the communication system is increased by cancellation of one of the first and second non-orthogonal signals at the mobile terminals. In the exemplary embodiment, the synchronization signal is cancelled at the Rake processing portion of the terminal by subtracting estimated interference terms from the Rake processing portion of the terminal.

In some embodiments, the synchronization signal is cancelled from the Rake processing portion of the terminal only when the synchronization signal exceeds a predetermined threshold. In some cases the threshold is set very low or at zero, whereby all received synchronization signals are canceled. In other applications, the threshold is set higher so that only some of the synchronization signals are cancelled, for example those having a specified signal strength, or by canceling the synchronization signals from select base stations.

Figure 5:
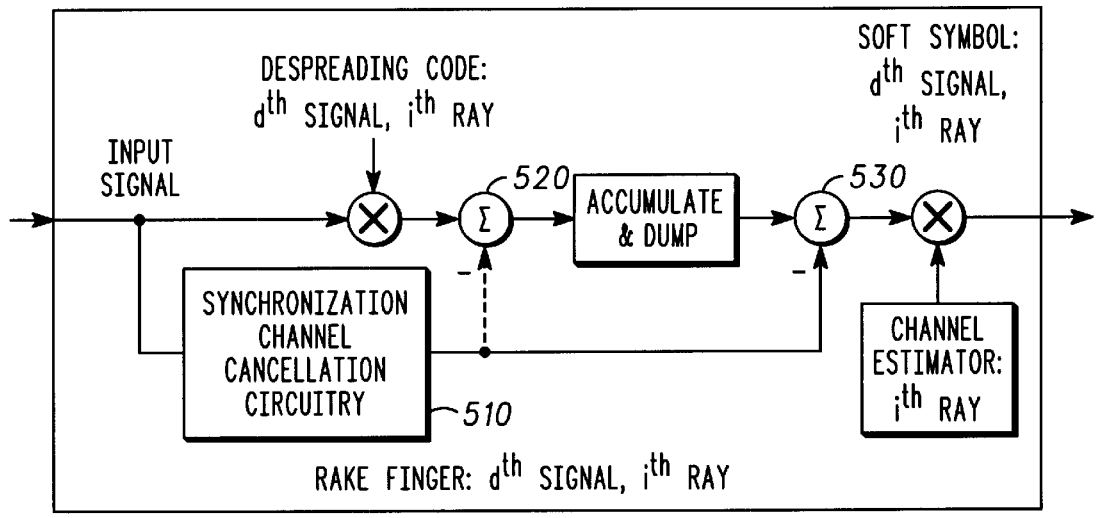
FIG. 5 is a more detailed illustration of a Rake finger of the Rake processing portion of the circuit.

FIG. 5 is a more detailed illustration of a Rake finger and exemplary synchronization channel cancellation portion 510. In FIG. 5, generally, the cancellation portion 510 generates an estimated synchronization signal interference term for subtraction from corresponding synchronization signal interference terms. The cancellation, and hence subtraction, may occur at the chip rate summer 520 or at a symbol rate summer 530. The symbol rate subtraction may occur at the Rake fingers as discussed below or at the output of the summation 410 of the Rake fingers in FIG. 4, since these two techniques represent mathematically equivalent operations.

Figure 6:
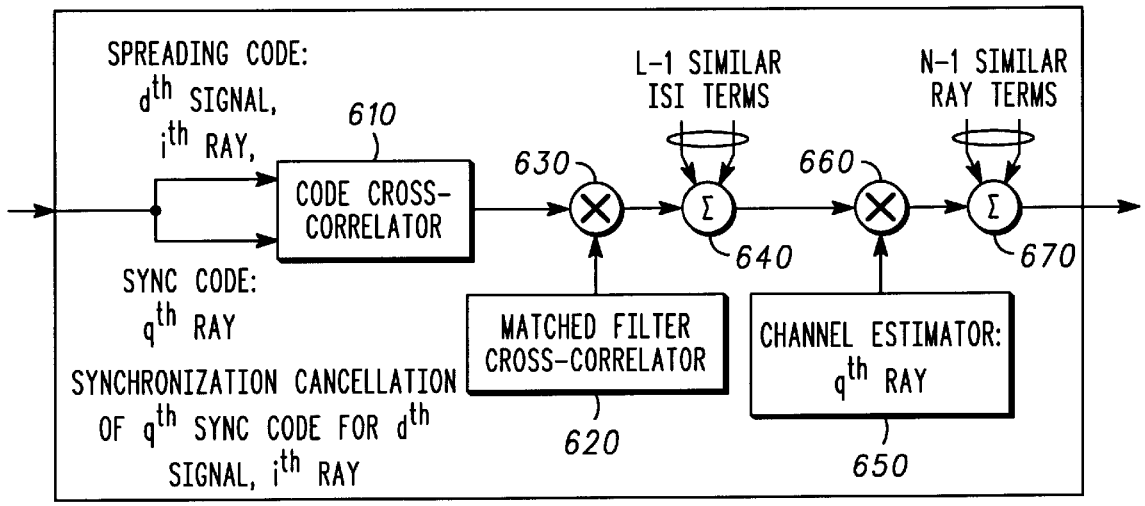
FIG. 6 is an exemplary synchronization cancellation architecture.

FIG. 6 is a detailed illustration of an exemplary synchronization cancellation architecture for generating estimated interference terms. Where the synchronization signal is transmitted in bursts, the subtraction of the estimated synchronization signal interference terms from the Rake processing portion of the terminal occurs in synchronization with the synchronization signal bursts.

The cancellation architecture comprises a code cross-correlator 610 having an output that is multiplied with a matched-filter auto-correlator 620 signal at multiplier 630, the output of which is summed with L-1 other inter-symbol-interference (ISI) terms at a summer 640, the output of which is multiplied with a channel estimator 650 signal at multiplier 660, the output of which is summed with N-1 similar terms which are due to the other N-1 multipath rays at summer 670. The parameters L and N may be chosen by the designer to best effect the cost tradeoff between performance and design complexity. Those skilled in the art will appreciate that the estimated synchronization interference terms may be generated by alternative schemes.

Figure 7:
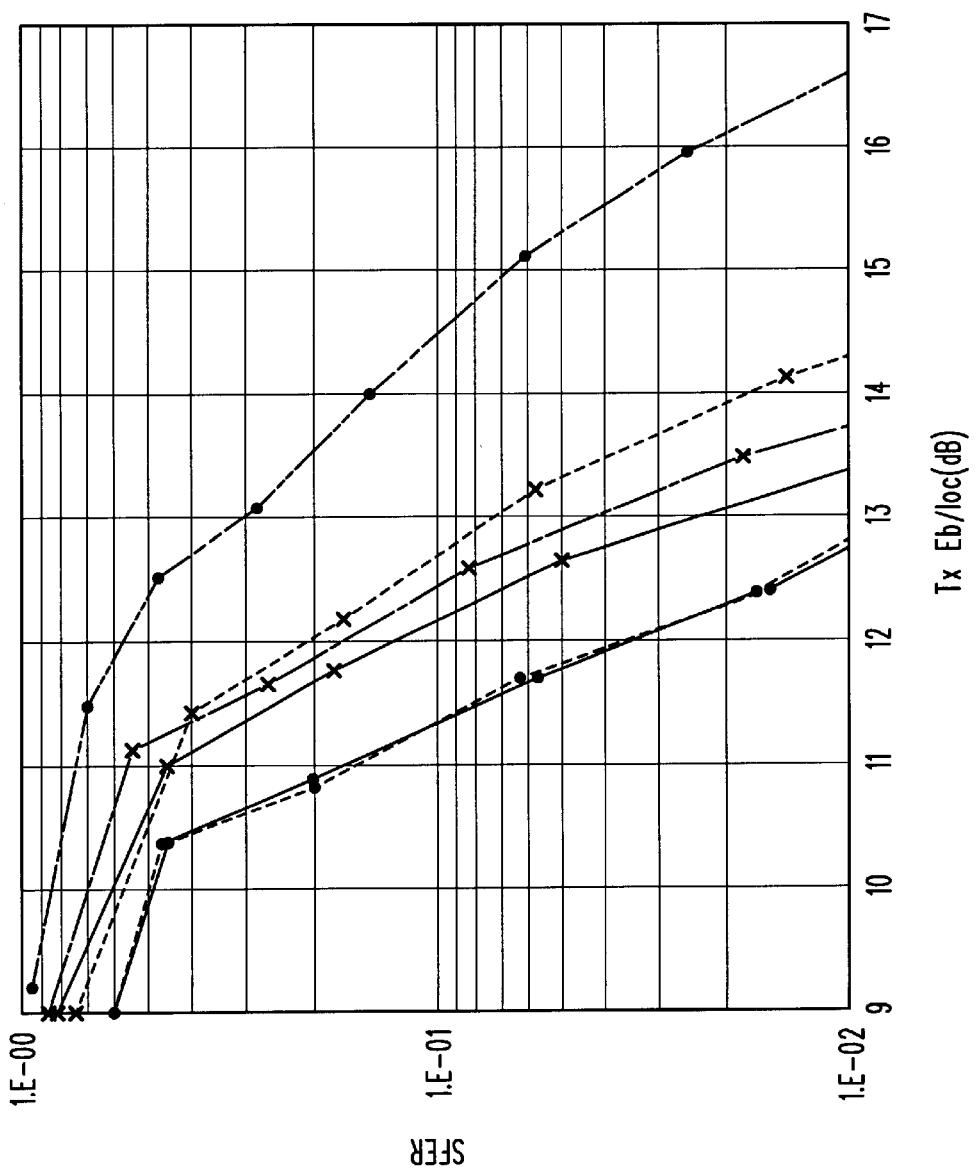
FIG. 7 is a graphical illustration of the effect of synchronization signal cancellation on system performance.

Cancellation of the synchronization signal at the terminals will improve the link-level budget, for example SIR vs. BER, or a similar measure, considerably. FIG. 7 is a family of curves illustrating link-level performance with cell geometry and synchronization-channel cancellation as a parameter, which demonstrates the efficacy of synchronization-channel cancellation at the terminal. Each curve is a plot of the required base transmit power ($Tx\_E_b$) divided by other cell interference, $I_{oc}$, which for this simulation is modeled as additive white gaussian noise at the mobile terminal, $Tx\_E_b/I_{oc}$ vs. the Service-Frame-Error-Rate (SFER). Parameters associated with each curve are the synchronization cancellation state (on or off), and the $\hat{I}_{or}/I_{oc}$ value. $\hat{I}_{or}/I_{oc}$ is a measure of the relative proximity of the base station to the terminal. The greater the $\hat{I}_{or}/I_{oc}$ value, the closer the terminal is to the base station. In FIG. 7, when the mobile terminal is operating at an $\hat{I}_{or}/I_{oc}$ value of 0 dB, there is negligible improvement in the link budget (less than 0.1 dB). However, for $\hat{I}_{or}/I_{oc}$ equal to approximately 12 dB, the link budget is improved by about 2.3 dB at an SFER of $10^{-2}$, which is a substantial gain in performance.

While the present inventions and what is considered presently to be the best modes thereof have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. A method in a code division multiple access mobile communications terminal, comprising:
    receiving a first signal at the terminal;
    receiving a second signal at the terminal, the first signal non-orthogonal to the second signal;
    increasing forward link capacity of a code division multiple access communication system from which the first and second non-orthogonal signals are received by canceling one of the first and second signals at a rake processing portion of the terminal.

2. The method of claim 1, first signal is a synchronization signal, increasing forward link capacity by canceling the synchronization signal at the Rake processing portion of the terminal.

3. The method of claim 2, canceling the synchronization signal at the Rake processing portion of the terminal only when the synchronization signal has a strength greater than a predetermined threshold.

4. The method of claim 2, the synchronization signal is a composite signal comprising primary and secondary components, increasing forward link capacity by canceling the primary and secondary components of the synchronization signal.

5. The method of claim 1, canceling the first signal by subtracting first signal estimated interference terms from a Rake finger of the Rake processing portion of the terminal.

6. The method of claim 1, receiving the first and second signals by receiving a composite signal comprising the first and second signals.

7. The method of claim 6, the first signal is a synchronization signal, increasing forward link capacity by canceling the synchronization signal by subtracting estimated synchronization signal interference terms from the Rake processing portion of the terminal.

8. The method of claim 7, canceling the synchronization signal by subtracting synchronization signal interference terms from less than all Rake fingers of the Rake processing portion of the terminal.

9. The method of claim 7, canceling the synchronization signal by subtracting corresponding synchronization signal interference terms from all Rake fingers of the Rake processing portion of the terminal.

10. A method in a code division multiple access communication system including a network of base stations, comprising:
    transmitting a composite signal comprising first and second non-orthogonal signals from a base station of the code division multiple access communication system;
    receiving the composite signal at a mobile terminal in the code division multiple access communication system;
    increasing forward link capacity of the code division multiple access communication system by canceling one of the first and second non-orthogonal signals at the mobile terminal.

11. The method of claim 10, one of the first and second signals is a synchronization signal non-orthogonal to the other of the first and second signals, increasing forward link capacity by canceling the synchronization signal at the mobile terminal by subtracting estimated synchronization signal interference terms from a Rake processing portion of the mobile terminal.

12. The method of claim 11, transmitting the synchronization signal in bursts from the base station of the code division multiple access communication system, canceling the synchronization signal bursts at the mobile terminal by subtracting estimated synchronization signal interference terms from the Rake processing portion of the mobile terminal in synchronization with the synchronization signal bursts.

13. The method of claim 11, canceling the synchronization signal at the mobile terminal by subtracting synchronization signal interference terms from all Rake fingers of the Rake processing portion of the mobile terminal.

14. The method of claim 11, canceling the synchronization signal at the mobile terminal by subtracting synchronization signal interference terms from less than all Rake fingers of the Rake processing portion of the mobile terminal.

15. The method of claim 11, canceling the synchronization signal from the Rake processing portion of the mobile terminal only when a characteristic of the synchronization signal exceeds a predetermined threshold.

16. A method in a code division multiple access communication system comprising network infrastructure and a plurality of mobile terminals, comprising:

transmitting composite signal comprising a synchronization signal and another non-orthogonal signal from the network infrastructure of the code division multiple access communication system;

receiving the composite signal at the plurality of mobile terminals of the code division multiple access communication system;

increasing forward link capacity of the code division multiple access communication system by canceling the synchronization signal from at least some of the plurality of mobile terminals.

17. The method of claim 16, canceling the synchronization signal from a Rake processing portion of the mobile terminals by subtracting estimated synchronization signal interference terms from Rake finger outputs of the mobile terminals.

18. The method of claim 16, canceling the synchronization signal from a Rake processing portion of the mobile terminals only when the synchronization signal exceeds a predetermined threshold.

19. The method of claim 16, canceling the synchronization signal at the mobile terminal by subtracting synchronization signal interference terms for less than all Rake fingers of the Rake processing portion of the mobile terminal.

20. The method of claim 16, canceling the synchronization signal at the mobile terminal by subtracting synchronization signal interference terms for all Rake fingers of the Rake processing portion of the mobile terminal.

\* \* \* \* \*